US012797981B2

(12) United States Patent
Van Essen et al.

(10) Patent No.: US 12,797,981 B2
(45) Date of Patent: Nov. 17, 2026

(54) DIE FOR A PIPE THREADER

(71) Applicant: MILWAUKEE ELECTRIC TOOL CORPORATION, Brookfield, WI (US)

(72) Inventors: James J. Van Essen, Hales Corners, WI (US); Benjamin L. Miller, Milwaukee, WI (US); Jacob A. Krabbe, Milwaukee, WI (US); Jonathan G. Winter, Burlington, WI (US); Zachary J. Geschke, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 549 days.

(21) Appl. No.: 18/000,402

(22) PCT Filed: Jun. 22, 2021

(86) PCT No.: PCT/US2021/038396

§ 371 (c)(1),
(2) Date: Dec. 1, 2022

(87) PCT Pub. No.: WO2021/262664

PCT Pub. Date: Dec. 30, 2021

(65) Prior Publication Data

US 2023/0211429 A1 Jul. 6, 2023

Related U.S. Application Data

(60) Provisional application No. 63/043,851, filed on Jun. 25, 2020.

(51) Int. Cl.
*B23G 1/24* (2006.01)
*B23G 5/00* (2006.01)

(52) U.S. Cl.
CPC ............... *B23G 1/24* (2013.01); *B23G 5/005* (2013.01); *B23G 2200/02* (2013.01);
(Continued)

(58) Field of Classification Search
CPC . B23G 1/22; B23G 1/24; B23G 5/005; B23G 5/04; B23G 2200/02;
(Continued)

(56) References Cited

U.S. PATENT DOCUMENTS 141,234 A 7/1873 Peace et al.
1,038,482 A 9/1912 Borden
(Continued)

FOREIGN PATENT DOCUMENTS

CN 201455465 U 5/2010
CN 204381445 U 6/2015
(Continued)

OTHER PUBLICATIONS

International Search Report and Written Opinion for Application No. PCT/US2021/038396 dated Oct. 18, 2021 (11 pages).
(Continued)

*Primary Examiner* — Eric A. Gates
(74) *Attorney, Agent, or Firm* — Michael Best & Friedrich LLP

(57) ABSTRACT

A die for a pipe threading operation includes a body portion formed of a first material, and a tooth portion coupled to the body portion and formed of a second material that is different than the first material. The tooth portion having a plurality of teeth.

15 Claims, 3 Drawing Sheets

(52) U.S. Cl.
CPC .... *B23G 2200/06* (2013.01); *B23G 2200/062* (2013.01); *B23G 2200/067* (2013.01); *B23G 2200/24* (2013.01); *Y10T 408/90473* (2015.01)

(58) Field of Classification Search
CPC .......... B23G 2200/06; B23G 2200/062; B23G 2200/067; B23G 2200/24; Y10T 408/90473
See application file for complete search history.

(56) References Cited

U.S. PATENT DOCUMENTS

| | | | | | |
|---|---|---|---|---|---|
| 1,044,808 | A | | 11/1912 | Oster | |
| 1,338,083 | A | | 4/1920 | Ibach | |
| 1,535,728 | A | * | 4/1925 | Lee | B23G 5/04 408/221 |
| 1,724,497 | A | | 8/1929 | Mehl | |
| 1,754,092 | A | | 4/1930 | Funk | |
| 1,877,797 | A | * | 9/1932 | Bouchard | B23G 1/22 408/28 |
| 2,150,037 | A | * | 3/1939 | Reed | B23G 5/10 408/221 |
| 3,165,768 | A | * | 1/1965 | Herbkersman | B23G 1/22 408/148 |
| 3,812,547 | A | * | 5/1974 | Reich | B23G 5/04 407/85 |
| 3,852,859 | A | | 12/1974 | Carpenter | |
| 3,968,549 | A | | 7/1976 | Carpenter | |
| 4,329,093 | A | | 5/1982 | Maruyama | |
| 5,004,379 | A | | 4/1991 | Little | |
| 5,088,861 | A | | 2/1992 | Little | |
| 5,195,167 | A | | 3/1993 | Bahl et al. | |
| 5,308,197 | A | | 5/1994 | Little | |
| 5,712,030 | A | | 1/1998 | Goto et al. | |
| 5,890,852 | A | | 4/1999 | Gress | |
| 6,168,356 | B1 | | 1/2001 | Sjoo et al. | |
| 6,343,898 | B1 | | 2/2002 | Sjoo et al. | |
| 7,476,063 | B2 | | 1/2009 | Wickman et al. | |
| 7,568,865 | B1 | * | 8/2009 | Ketterer | B23G 5/10 407/101 |
| 7,771,847 | B2 | | 8/2010 | Kukino et al. | |
| 8,186,460 | B2 | | 5/2012 | Garcia et al. | |
| 8,449,226 | B2 | | 5/2013 | Nasu et al. | |
| 8,740,516 | B2 | * | 6/2014 | Yoshiba | B23B 27/065 407/113 |
| 9,657,765 | B2 | | 5/2017 | Steffi | |
| D848,496 | S | | 5/2019 | Maeta et al. | |
| D909,437 | S | | 2/2021 | Sorai et al. | |
| 2006/0024140 | A1 | | 2/2006 | Wolff et al. | |
| 2019/0232593 | A1 | | 8/2019 | Feistritzer et al. | |
| 2022/0168832 | A1 | | 6/2022 | Wolf | |

FOREIGN PATENT DOCUMENTS

| | | | | | |
|---|---|---|---|---|---|
| CN | 204381446 | U | | 6/2015 | |
| CN | 204381450 | U | | 6/2015 | |
| CN | 204381457 | U | | 6/2015 | |
| CN | 104772479 | A | | 7/2015 | |
| CN | 103302325 | B | | 11/2016 | |
| CN | 109420780 | A | | 3/2019 | |
| CN | 109877349 | B | | 4/2020 | |
| DE | 2406840 | A1 | | 8/1975 | |
| DE | 3321982 | C1 | | 10/1984 | |
| DE | 4304104 | C2 | | 4/1995 | |
| DE | 19858088 | A1 | | 1/2000 | |
| DE | 102004059777 | A1 | | 6/2006 | |
| DE | 102013206497 | A1 | | 10/2014 | |
| EM | 015018723-0008 | | | 4/2023 | |
| EP | 1093875 | B1 | | 4/2007 | |
| EP | 3636375 | A1 | * | 4/2020 | B33Y 80/00 |
| FR | 994025 | A | * | 11/1951 | |
| JP | 2001310204 | A | | 11/2001 | |
| JP | 2002166326 | A | | 6/2002 | |
| JP | 2011148066 | A | | 8/2011 | |
| KR | 300658819 | | | 9/2012 | |
| KR | 101329825 | B1 | | 11/2013 | |
| WO | 8301217 | A1 | | 4/1983 | |
| WO | 2011140831 | A1 | | 11/2011 | |
| WO | 2018153907 | A1 | | 8/2018 | |

OTHER PUBLICATIONS

RIDGID, "RIDGID 47745 Threading Machine Dies, Right-Handed Alloy NPT Pipe Dies with Nominal Pipe Size of 1/2-Inch to 3/4-Inches for Universal Die Heads," <https://www.amazon.com/47745-Threading-Right-Handed-4-Inches-Universal/dp/B0009XB1Y2/ref> web page visited Nov. 4, 2024 (9 pages).

Staten Tools, "NPT Universal 47770 1'-2' HS Hardened steel Pipe Dies fits RIDGID 811, 811A, 815A Die Head," <https://www.amazon.com/dp/B0BKZGCLV5/ref=sspa_dk_hqp_detail_aax_O?p_csd=d2lkZ2VOTmFITZ1zcF9ocXBfc2hhcmVk&th=1> web page visited Nov. 4, 2024 (8 pages).

Steel Dragon Tools, "Steel Dragon Tools 48260 HSS 1'—8 UNC HS Bolt Dies fits RIDGID 811A 815A Die Heads," <https://www.amazon.com/Steel-Dragon-Tools-48260-RIDGID/dp/B0040460JW/ref> web page visited Nov. 4, 2024 (5 pages).

RIDGID, "RIDGID 48735 1-inch 500B High Speed Bolt Dies," <https://www.amazon.com/dp/B003ROL6C6/ref> web page visited Nov. 4, 2024 (6 pages).

* cited by examiner

DIE FOR A PIPE THREADER

CROSS-REFERENCE TO RELATED APPLICATIONS

This application is a national stage filing under 35 U.S.C. § 371 of International Application No. PCT/US2021/038396, filed Jun. 22, 2021, which claims priority to U.S. Provisional Application No. 63/043,851, filed Jun. 25, 2020, the entire contents of which are incorporated by reference herein.

FIELD OF THE INVENTION

The present invention relates to pipe threaders, and more particularly to dies for pipe threaders.

BACKGROUND OF THE INVENTION

Pipe threaders use a plurality of dies to cut threads into a pipe. After multiple pipe threading operations, the dies may wear out and need to be replaced.

SUMMARY OF THE INVENTION

The present invention provides, in one aspect, a die for a pipe threading operation. The die includes a body portion formed of a first material, and a tooth portion coupled to the body portion and formed of a second material that is different than the first material. The tooth portion includes a plurality of teeth.

The present invention provides, in another aspect, a die for a pipe threading operation. The die includes a body portion, a tooth portion coupled to the body portion and having a plurality of teeth, and an internal oil passage having a first port in the body portion and a second port in the tooth portion. The internal oil passage is configured to provide lubrication to the plurality of teeth during the pipe threading operation.

The present invention provides, in yet another aspect, a die for a pipe threading operation. The die includes a body portion and a tooth portion coupled to the body portion. The tooth portion has a plurality of teeth and a rake face adjacent the plurality of teeth. The die also includes a chip breaker formed on the rake face of the tooth portion to break off and separate chips from a pipe during the pipe threading operation.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
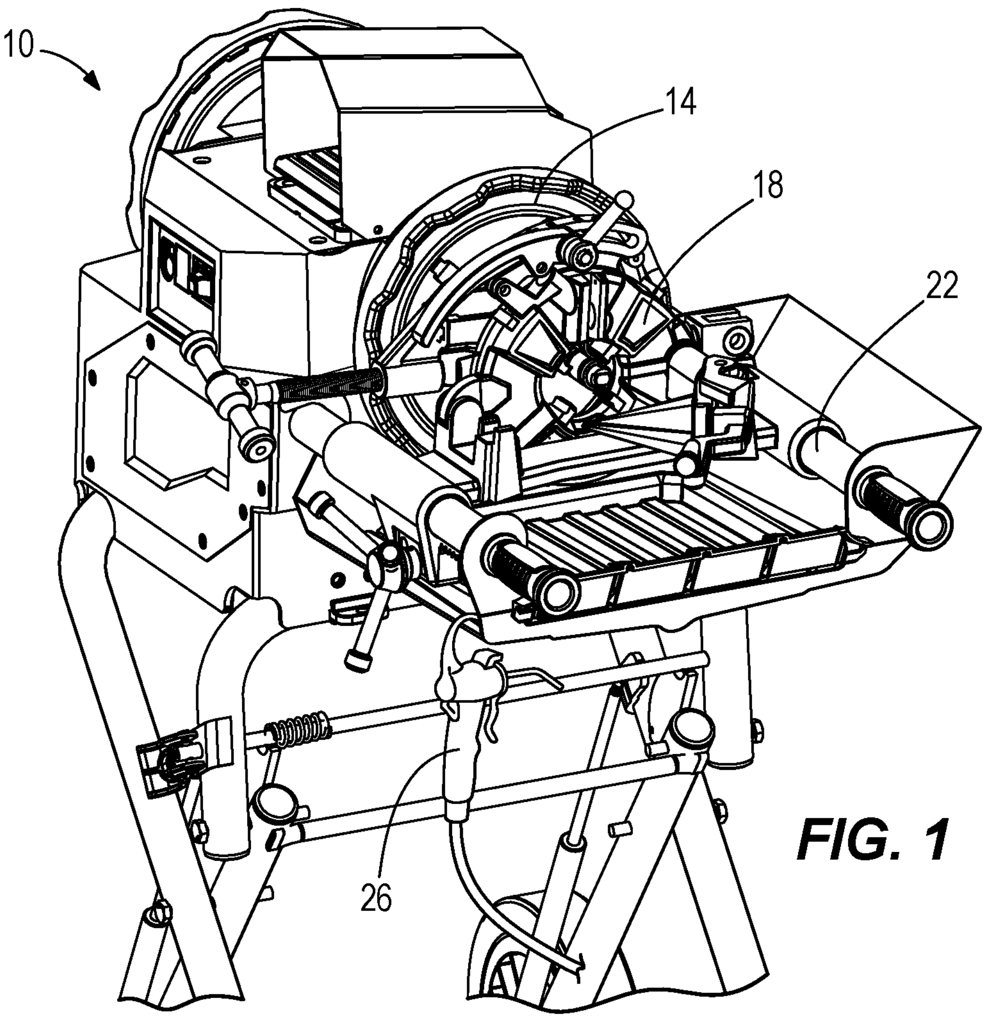
FIG. 1 is a perspective view of a pipe threading assembly.
Figure 2:
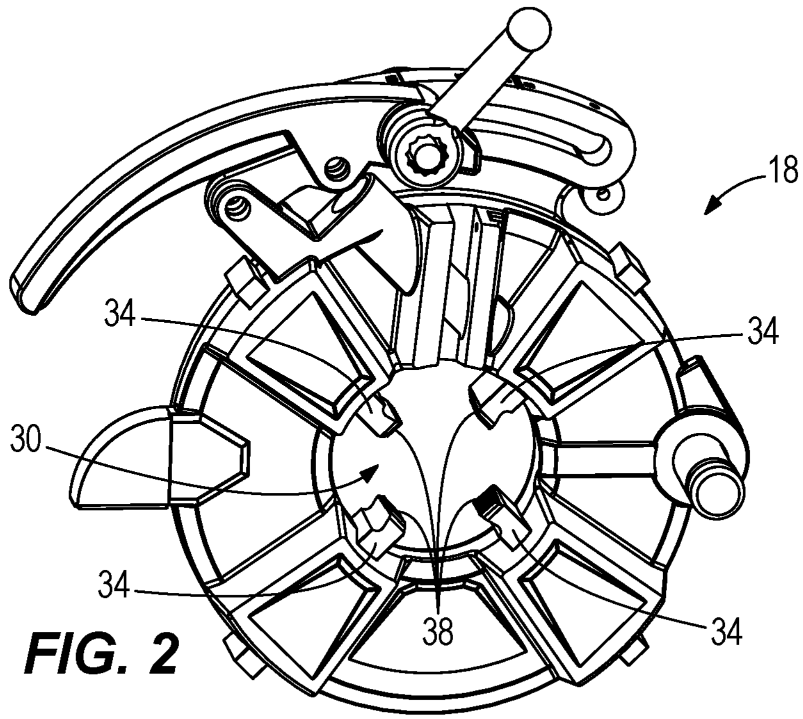
FIG. 2 is a perspective view of a die head of the pipe threading assembly of FIG. 1.

As shown in FIG. 1, a pipe threading assembly 10, or pipe threader, includes a power drive 14 for rotating a pipe, a die head 18 coupled to the power drive 14 via an extension 22, and an oil gun 26 for applying oil during a pipe threading operation. As shown in FIG. 2, the die head 18 is configured to hold a set of dies 30, which are directed radially inward. In some embodiments, the set of dies 30 includes four individual dies 34. In other embodiments, the set of dies 30 may include fewer or more dies 34. Each die 34 has a plurality of teeth 38 with a slightly different thread alignment for cutting threads into the pipe. During operation, a section of pipe is set in the power drive 14 and arranged within the die head 18 such that the teeth 38 of each die 34 are in contact with the pipe. The power drive 14 then rotates the section of pipe, and the teeth 38 cut threads into the section of pipe. As the teeth 38 cut threads into the pipe, oil is applied with the oil gun 26 onto the dies and the section of pipe is rotated until the threading operation is complete. Black pipe and stainless steel pipe are common pipe materials that are threaded with the pipe threading assembly 10. However, the teeth 38 of the dies 34 sometimes degrade after multiple operations, particularly when threading stainless steel pipe.

Figure 3:
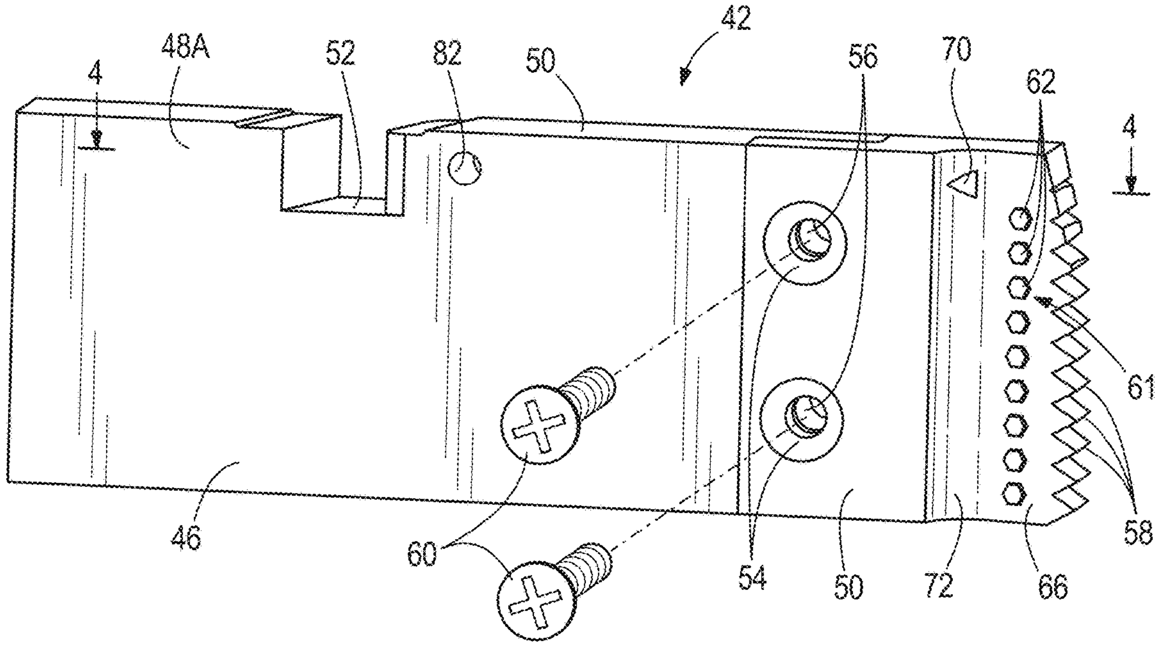
FIG. 3 is a perspective view of a die for use with the pipe threading assembly of FIG. 1.
Figure 4:
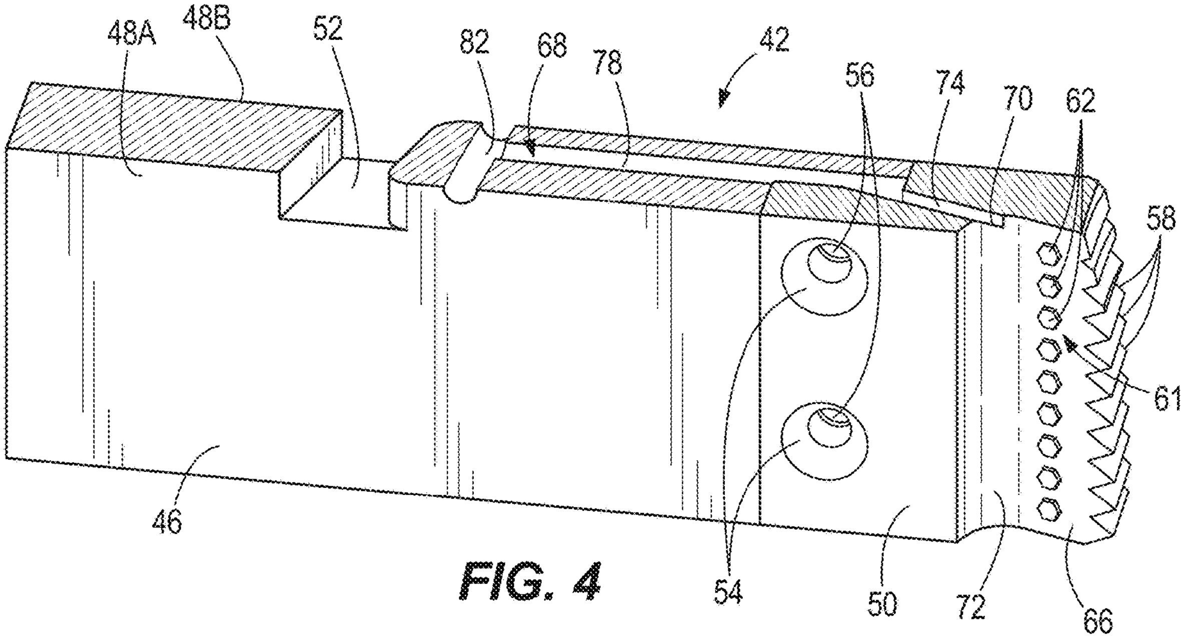
FIG. 4 is a cross-sectional view of the die of FIG. 3 taken along section line 4-4 of FIG. 3.

FIGS. 3 and 4 illustrate another embodiment of a die 42, which can be part of a set of dies to be used with the die head 18 of the pipe threading assembly 10 (FIG. 1). The illustrated die 42 is a two-piece die including a body portion 46 and a tooth portion 50. The tooth portion 50 is coupled to the body portion 46. The body portion 46 is generally rectangular and includes a first face 48A and a second face 48B opposite the first face 48A. The body portion 46 also includes an edge 50, such as a lateral edge, extending between the first face 48A and the second face 48B. The body portion 46 includes a recess 52 formed in the edge 50 of the body portion 46. The recess 52 is configured to allow the die 42 to be secured within the die head 18. In other embodiments, the body portion 46 may include other suitable features for securing the die 42 to the die head 18.

The tooth portion 50 is coupled to an end of the body portion 46. In the illustrated embodiment, the tooth portion 50 includes one or more mounting bores 54 that align with corresponding mounting bores 56 in the body portion 46 when the tooth portion 50 is mated with the body portion 46. The mounting bores 54, 56 allow fasteners 60 (FIG. 3) to be passed through the bores 54, 56 to secure the tooth portion 50 to the body portion 46. In some embodiments, the fasteners 60 may be, for example, bolts or screws. The illustrated tooth portion 50 has generally the same width or thickness as the body portion 46 (measured between the first face 48A and the second face 48B) such that the die 42 appears to be a continuous, uniform body when the tooth portion 50 is coupled to the body portion 46.

The tooth portion 50 includes a plurality of teeth 58 for cutting threads into a section of pipe. The teeth 58 are formed along an edge of the tooth portion 50 opposite from the body portion 46. The illustrated teeth 58 progressively increase in size from a first end (e.g., the top as shown in FIG. 3) to a second end (e.g., the bottom as shown in FIG.

3) of the tooth portion 50. In other embodiments, the teeth 58 may have other configurations.

In some embodiments, the body portion 46, which is not in contact with the pipe during a threading operation, is formed of a first material, such as steel (e.g., a lower grade carbon steel). In some embodiments, the tooth portion 50 is formed of a second material that is different than the first material, such as carbide. When the tooth portion 50 is formed from carbide, the longevity of the tooth portion 50 is advantageously increased, even after many pipe threading operations, in comparison with a single piece die that is formed entirely of lower grade steel. Advantageously, instead of having to replace an entire die 34, by using two piece die 42, when the tooth portion 50 ultimately wears out, the tooth portion 50 can be removed from the body portion 46 and a replacement tooth portion 50 can be coupled to the body portion 46.

Alternatively, in other embodiments, the tooth portion 50 is not removable from the body portion 46. Instead, the die 42 is formed as a permanent two-piece design including the tooth portion 50 coupled to the body portion 46 via a welded or brazed joint. The permanent two-piece die 42 design still advantageously results in a lower manufacturing cost, because the body portion 46 is formed of a less expensive material than the tooth portion 50. The operator would have to replace the entire permanent two-piece die 42 once it wears out, but it would still be less expensive to manufacture than a die with both its tooth and body portions formed entirely of carbide.

In some embodiments, the body portion 46 and/or tooth portion 50 are formed by an additive manufacturing process. For example, the body portion 46 and/or the tooth portion 50 may be formed by metal injection molding or 3D printing. Such manufacturing processes facilitate forming more intricate features in the die 46, such as a chip breaker and an internal oil passage. In addition, the tooth portion 50 (particularly the cutting teeth 58) can be made to a near-net shape, and then ground to a final shape post process.

With continued reference to FIG. 3, the tooth portion 50 includes a chip breaker 61. The chip breaker 61 is formed on a rake face 66 of the tooth portion 50 relative to the teeth 58. The rake face 66 is adjacent the teeth 58 and located between the teeth 58 and the mounting bores 54 of body portion 46. The illustrated rake face 66 is also generally planar and tapers inwardly from the teeth 58 such that the thickness of the tooth portion 50 decreases from the teeth 58. In other embodiments, the rake face 66 may have other configurations, such as being non-linear/planar or having multiple surfaces at different angles. In the illustrated embodiment, the chip breaker 61 includes a plurality of individual protrusions 62. The protrusions 62 are arranged in a row and extend outwardly from the rake face 66. The chip breaker 61 is configured to break off and separate chips—the metal that is removed by the teeth 38, sometimes forming a string—from the section of pipe during the pipe threading process. In the illustrated embodiment, the individual protrusions 62 have a hexagonal shape. In other embodiments, the protrusions 62 may have other shapes (e.g., square, triangular, circular, oblong, etc.). In still other embodiments, instead of individual protrusions 62, the chip breaker 61 may include a continuous ridge extending along a length of the rake face. In some embodiments, the chip breaker 61 is formed on the tooth portion 50 via metal injection molding or 3D printing. In some embodiments, the chip breaker 61 could also be included on a rake face of a single piece die, such as the die 34 in the embodiment of FIGS. 1 and 2.

With reference to FIGS. 3 and 4, the die 42 includes an internal oil passage 68 formed in the body portion 46 and the tooth portion 50. The internal oil passage 68 is configured to deliver lubrication (e.g., from the oil gun 26 (FIG. 1)) to the teeth 58 and, thereby, the section of pipe being threaded. The illustrated internal oil passage 68 is adjacent the edge 50 of the die 42. More particularly, the internal oil passage 68 is adjacent the edge 50 of the die 42 that also has the recess 52 for connecting the die 42 to the die head 18. That is, the internal oil passage 68 is closer to the edge 50 than to an opposite edge or a midline of the die 42. In some embodiments, the internal oil passage 68 is formed in the body portion 46 and the tooth portion 50 using the additive manufacturing process.

In the illustrated embodiment, the internal oil passage 68 includes a first port 82 in the body portion 46, a first internal oil channel 78 (e.g., a body portion oil channel) in the body portion 46, a second port 70 in the tooth portion 50, and a second internal oil channel 74 (e.g., a tooth portion oil channel) in the tooth portion 50. The illustrated second port 70 is formed on a curvilinear face 72 of the tooth portion 50 adjacent the rake face 66. The curvilinear face 72 is positioned between the rake face 66 and the mounting bores 54. The first portion 70 is also adjacent the edge 50 of the die 42. The first port 70 is in fluid communication with the tooth portion oil channel 74 extending through the tooth portion 50. The body portion oil channel 78 aligns with and is in fluid communication with the tooth portion oil channel 74 when the tooth portion 50 is coupled to the body portion 46. The body portion oil channel 78 is in fluid communication with the first port 82. The illustrated first port 82 is a transverse bore extending through the body portion 46. That is, the first port 82 extends through the first face 48A and the second face 48B of the body portion 46 such that the first port 82 is accessible from either side of the die 42.

During a pipe threading operation, oil from the oil gun 26 (FIG. 1) can be applied, directly or through the die head 18, to the transverse bore 82 The oil subsequently flows through the body portion oil channel 78, the tooth portion oil channel 74, and exits out the second port 70, thereby contacting the rake face 66, the chip breaker 61, and the teeth 58. Application of oil to the rake face 66, the chip breaker 61, and the teeth 58 while the teeth 58 are cutting threads into the section of pipe provides lubrication to help ensure a smooth pipe threading operation. In some embodiments, voids created during an additive manufacturing process of the body portion 46 and voids created during an additive manufacturing process of the tooth portion 50 respectively form the body portion oil channel 78 of the body portion 46, and the tooth portion portion oil channel 74 and the second port 70 of the tooth portion 50. In some embodiments, the second port 70, and an accompanying internal oil channel, could be included on a curvilinear face of a single piece die, such as die 34 in the embodiment of FIGS. 1 and 2, with or without the chip breaker 61.

Figure 5:
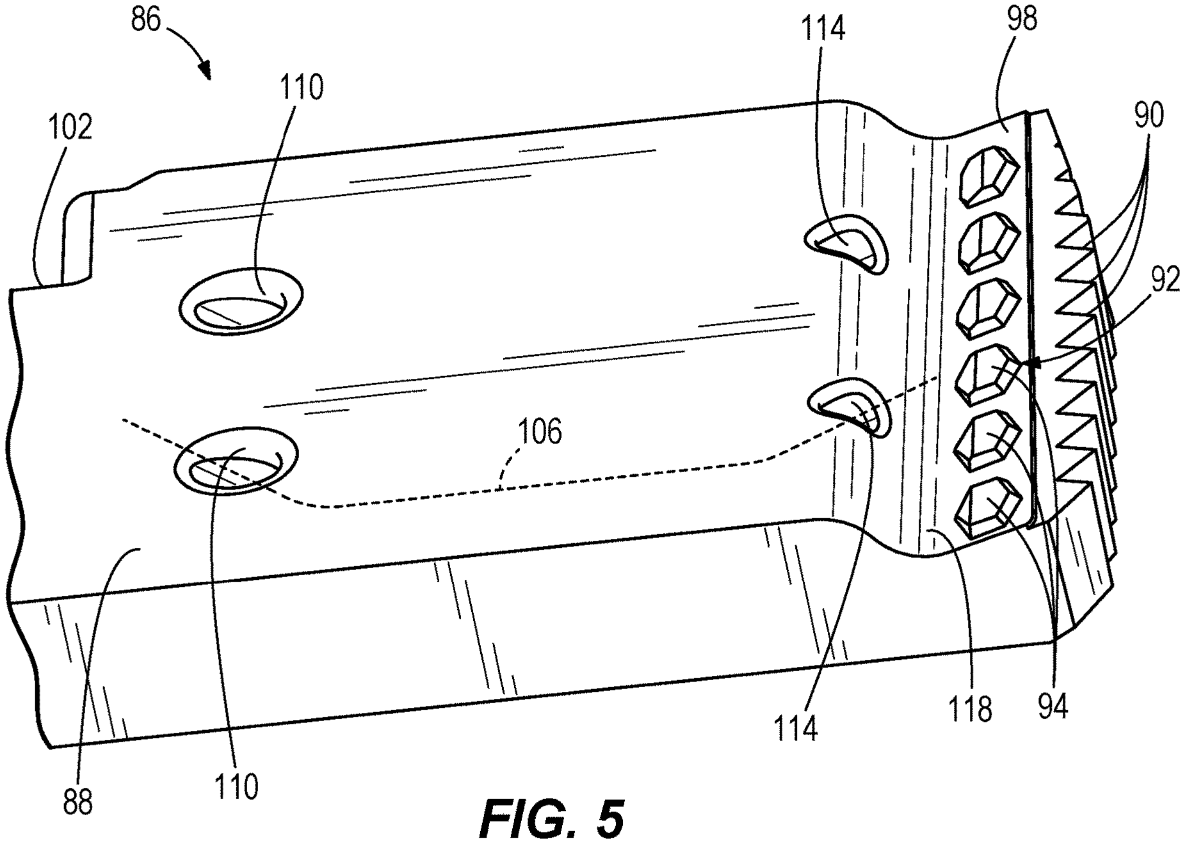
FIG. 5 is an enlarged perspective view of a die according to another embodiment of the invention.

FIG. 5 illustrates an embodiment of a single piece die 86 having a body portion 88, teeth 90, a chip breaker 92, and a recess 102 configured to allow the die 86 to be secured within the die head 18 (FIG. 1). The illustrated chip breaker 92 includes a plurality of individual protrusions 94 on a planar rake face 98 between the teeth 90 and the body portion 88. In the embodiment of FIG. 5, the die 86 also includes a pair of internal oil passages (one of which is indicated by dotted line 106). Each internal oil passage includes a first port 110 in the body portion 88 and a second port 114 that extends through a curvilinear face 118 between the rake face 98 and the body 88 (e.g., in a tooth portion of the die 86). One of the internal oil passages is positioned adjacent the edge of die 86 that has the recess 102, while the other internal oil passage is positioned adjacent an opposite edge of the die 86.

During a pipe threading operation, oil from the oil gun 26 (FIG. 1) can be applied, directly or through the die head 18, to the first ports 110. The oil then subsequently flows through the internal oil passages 106 and exits out the second port 114, thereby contacting the rake face 98, the chip breaker 92, and the teeth 90. In some embodiments, voids created during an additive manufacturing process of the die 86 form the oil passages 106.

Although the invention has been described in detail with reference to certain preferred embodiments, variations and modifications exist within the scope and spirit of one or more independent aspects of the invention as described. Various features and advantages of the invention are set forth in the following claims.

What is claimed is:

1. A die for a pipe threading operation, the die comprising:

a body portion formed of a first material, the body portion having a first face, a second face opposite the first face, a first lateral edge between the first face and the second face, and a second lateral edge opposite the first lateral edge and between the first face and the second face; and a tooth portion coupled to an end of the body portion such that the tooth portion covers the end, a first side of the tooth portion is generally aligned with the first face, and a second side of the tooth portion is generally aligned with the second face, the tooth portion formed of a second material that is different than the first material, the tooth portion having a plurality of teeth formed along an edge of the tooth portion opposite from the end of the body portion, wherein the tooth portion extends from the first lateral edge to the second lateral edge of the body portion, and wherein the tooth portion is removably coupled to the body portion.

2. The die of claim 1, wherein the first material is steel, and the second material is carbide.

3. The die of claim 2, wherein the first material is a low-grade carbon steel.

4. The die of claim 1, wherein the tooth portion includes a first bore aligned with a second bore in the body portion, and wherein a fastener passes through the first bore and the second bore to secure the tooth portion to the body portion.

5. The die of claim 1, wherein the body portion includes a recess formed in the first lateral edge of the body portion, and wherein the recess is configured to permit the die to be secured to a die head.

6. The die of claim 1, wherein the plurality of teeth progressively increases in size from a first tooth portion end of the tooth portion to a second tooth portion end of the tooth portion.

7. The die of claim 1, further comprising an internal oil passage including a first port in the body portion, a first internal oil channel in the body portion and in fluid communication with the first port, a second port in the tooth portion, and a second internal oil channel in the tooth portion and in fluid communication with the second port and the first internal oil channel, wherein the internal oil passage is configured to provide lubrication of the plurality of teeth.

8. The die of claim 1, further comprising a chip breaker formed on a rake face of the tooth portion adjacent the plurality of teeth.

9. The die of claim 8, wherein the rake face tapers inwardly such that a thickness of the tooth portion decreases from the plurality of teeth.

10. The die of claim 8, wherein the chip breaker is formed by metal injection molding or 3D printing.

11. The die of claim 1, wherein the body portion and the tooth portion are formed by an additive manufacturing process.

12. The die of claim 11, wherein the body portion and the tooth portion are formed by metal injection molding.

13. The die of claim 1, wherein the tooth portion has the same thickness as the body portion.

14. A die for a pipe threading operation, the die comprising:

a body portion formed of a first material;

a tooth portion coupled to the body portion and formed of a second material that is different than the first material, the tooth portion having a plurality of teeth; and an internal oil passage including a first port in the body portion, a first internal oil channel in the body portion and in fluid communication with the first port, a second port in the tooth portion, and a second internal oil channel in the tooth portion and in fluid communication with the second port and the first internal oil channel, wherein the internal oil passage is configured to provide lubrication to the plurality of teeth.

15. A die for a pipe threading operation, the die comprising:

a body portion formed of a first material, the body portion having a first face, a second face opposite the first face, a first lateral edge between the first face and the second face, and a second lateral edge opposite the first lateral edge and between the first face and the second face; and a tooth portion coupled to an end of the body portion such that the tooth portion covers the end, a first side of the tooth portion is generally aligned with the first face, and a second side of the tooth portion is generally aligned with the second face, the tooth portion formed of a second material that is different than the first material, the tooth portion having a plurality of teeth formed along an edge of the tooth portion opposite from the end of the body portion, wherein the tooth portion extends from the first lateral edge to the second lateral edge of the body portion, wherein the tooth portion is permanently coupled to the body portion by a welded or brazed joint.

* * * * *